May 7, 1968 R. B. TRELEASE 3,381,339
HYDRAULIC CASTING OF LIQUID POLYMERS
Original Filed Sept. 4, 1962
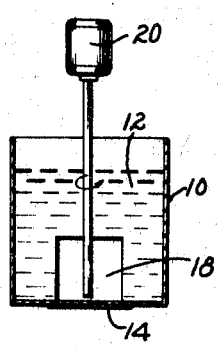
FIG. 1
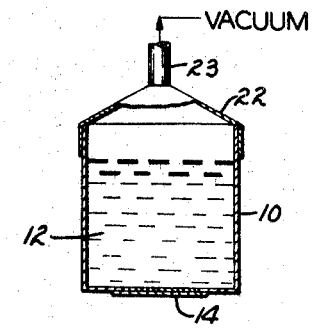
FIG. 2
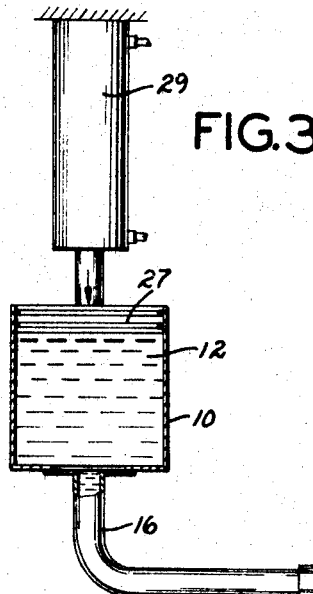
FIG. 3
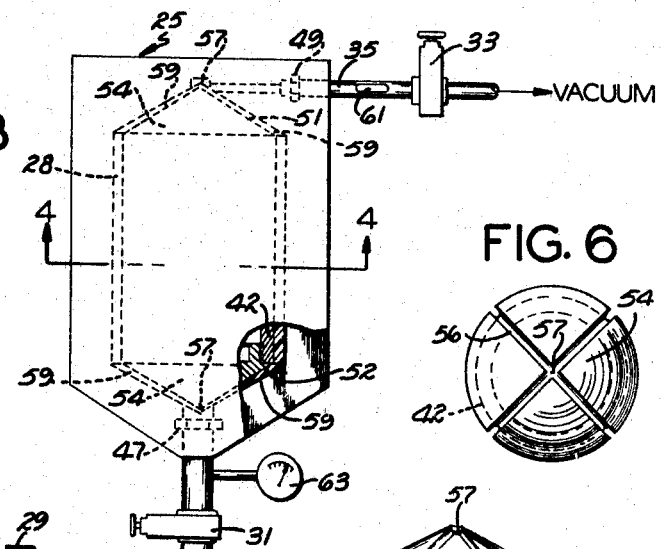
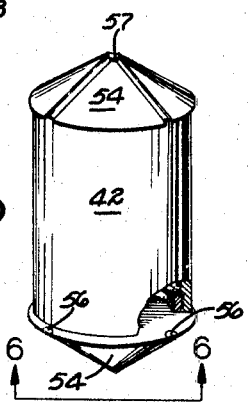
FIG. 5
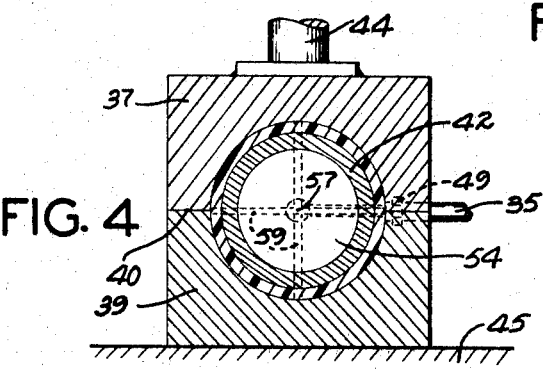
FIG. 4
FIG. 6
INVENTOR.
ROBERT B. TRELEASE
BY FULWIDER, PATTON,
RIEBER, LEE & UTECHT
ATTORNEYS

United States Patent Office 3,381,339
Patented May 7, 1968

3,381,339
HYDRAULIC CASTING OF LIQUID POLYMERS
Robert B. Trelease, Los Alamitos, Calif., assignor, by mesne assignments, to the United States of America as represented by the Administrator of the National Aeronautics and Space Administration
Original application Sept. 4, 1962, Ser. No. 220,982. Divided and this application May 12, 1966, Ser. No. 567,806
4 Claims. (Cl. 18—26)

ABSTRACT OF THE DISCLOSURE

This invention relates to improvements in apparatus for casting materials, such as liquified polymers, under elevated pressures. More specifically, the invention provides, in a pressurized, closed-mold system, a core member which includes channeled and outwardly tapered or conical end portions adapted to be mated or received in conical supporting surfaces disposed within the cavity of the mold. These surfaces are arranged adjacent opposed transfer and exit fluid conducting ports. The channels of the conical end portions are uniformly distributed and extend radially from the apex to form sprues terminating about the circumference of the end portions of a cylindrical body of the core so that as viscous material is fed or forced from a first isolating valve into the mold cavity, through the sprues, it is caused to be injected from one end of the cavity in a substantially uniform manner. The injected material is caused to progress along the exterior surface of the body of the core to be discharged from the cavity to a second isolating valve, through the converging channels or sprues of the opposite end. The isolating valves are provided at either side of the cavity in order to isolate the mold to thus assure that desired pressure and material distribution is established and maintained within the mold during the injection and curing stages of the casting process in order to achieve substantial uniformity in the resulting products or castings.

ORIGIN OF THE INVENTION

The invention described herein was made in the performance of work under a NASA contract and is subject to the provisions of Section 305 of the National Aeronautics and Space Act of 1958, Public Law 85-568 (72 Statute 435; 42 U.S.C. 2457). This application is a divisional of application Serial No. 220,982, filed Sept. 4, 1962.

In recent years, molded plastic objects have found wide application in a great number of fields. With continued development of new plastic materials, providing a diversity of physical and chemical properties to meet various product requirements, there is every indication that the range of useful applications of molded plastic articles will expand at an ever increasing rate.

The molding of plastic articles is accomplished by filling a mold cavity with a fluidized plastic which is subsequently solidified to produce an object conforming to the shape of the mold cavity and requiring only finishing operations. The molding techniques selected for the fabrication of such articles generally depends upon the specific type of plastic material employed.

Generally, thermoplastic materials, e.g. those which fluidize upon heating and resolidify upon cooling, are molded by injection molding techniques, wherein the plastic material is metered into a heated cylinder. From the latter cylinder, the molten plastic is forced by a ram into a closed, fluid-cooled mold. The plastic material solidifies upon cooling within the mold and is readily withdrawn in its solid state when the mold is opened.

Compression and transfer molding techniques are generally reserved for thermosetting plastics which irreversibly set or cure with the application of heat. In both of those molding processes, the plastic material is metered into a mold cavity between two half sections of the mold which are held between the platens of a press. The mold is heated, and pressure is applied by the press to bring the two sections of the mold togeher. The heat and pressure cause the fluidized plastic to solidify in the shape of the mold cavity.

Plastic materials can also be cast in open molds in a manner similar to that used for casting molten metals, but most of the aforedescribed thermoplastic and thermosetting materials are not sufficiently fluidized below their decomposition temperatures to fill molds without the application of external pressure. However, there is a class of rubber and plastic materials, hereinafter referred to as plastics, which are normally in a liquid state and which are capable of being polymerized or reacted into a solid state by means of an added catalyst. In some cases, polymerization may also require heating, as well as the addition of a catalyst. In this class of materials, e.g. liquid monomer or partially polymerized solutions utilizing a monomer as the solvent, a definite predetermined quantity of the catalyst used to promote solidification is usually added to the plastic just prior to the molding operation.

Liquid polymer plastics are generally used by pouring the casting liquid onto open molds. The viscosity of the casting liquid is usually low enough for the polymer to flow and fill the mold cavity, proper fill being determined by the liquid level within the mold. Conditions may be adjusted so that polymerization takes place relatively slowly at room temperatures, or, with some plastics, the mold may be heated to promote curing of the plastic material.

Casting of liquid polymers is also used for "potting" or encapsulation of various objects. In such potting applications, the liquid polymer and the article to be potted are placed within a mold cavity, the plastic material uniting with the potted article during the cure cycle. The orientation of the mold cavity, and gravitational leveling of the liquid polymer, establish the exposed surface of the potted compound.

Although casting of liquid polymers in open molds is satisfactory for many applicatitons, a number of cases exist where it is necessary to precisely mold such liquid polymers into complex configurations having extremely close dimensions, e.g. as in the case of coating another article with a precise thickness of a specified liquid polymer material. Such stringent requirements can generally be satisfied only within closed, high pressure molds. Hence, those concerned with the development of molding techniques and apparatus have long recognized the need for improved means for casting liquid polymer plastics in this manner. The present invention fulfills this need.

Moreover, in potting articles within liquid polymer plastic materials, it has been found that the addition of pressure substantially enhances the potting process. Therefore, the apparatus of the present invention is also capable of producing potted articles of precise configuration and enhanced quality.

Accordingly, it is an object of the present invention to provide a new and improved apparatus for casting liquid polymers.

Another object is to provide apparatus for molding liquid polymer materials into configurations having extremely close dimensions.

A further object of the invention is the provision of an improved means for casting liquid polymers under controlled pressures.

Still another object is to provide apparatus for molding a liquid polymer material under its own hydraulic pressure to a precise configuration.

Yet another object of the present invention is provision of an improved means for potting articles in liquid polymer materials.

A still further object is to provide means for controlled polymerization within a closed mold of a liquid polymer plastic under precisely controlled hydraulic pressure.

The above and other objects and advantages of this invention will be better understood by reference to the following detailed description when considered in connection with the accompanying drawings of an illustrative embodiment thereof, wherein:

FIGURES 1 and 2 are sectioned elevational views illustrating the agitation and de-aeration stages for preparing the liquid polymer casting material;

FIGURE 3 is a partially sectioned elevational view, portions being broken away, of the apparatus for transferring and molding the liquid polymer material in accordance with the invention;

FIGURE 4 is a sectional view taken along the line 4—4 through the mold of FIGURE 3;

FIGURE 5 is a perspective view, a portion being broken away, of one type of core suitable for use with the mold of FIGURES 3 and 4; and FIGURE 6 is an end view, taken along the line 6—6 of FIGURE 5, illustrating the structure of the core end caps for aligning the core within the mold and which cooperate with the mold bearing surfaces to provide manifold end sprues.

Referring now to the drawing, and particularly to FIGURES 1–3 thereof, a tank 10 provides a container for a fluid body 12 of a selected liquid plastic material. Separate tanks may be employed for each phase of preparing the liquid polymer, or the single tank 10 may be appropriately adapted to contain the fluid body 12 during each of the agitation, de-aeration, and tank-to-mold transfer phases of the polymerizing process. To this end, the tank 10 is provided with a plug fitting 14 which normally seals the bottom of the tank as shown in FIGURES 1 and 2. The plug 14 is removable, however, to provide an opening in the tank 10 through which the fluid body 12 can enter a transfer pipe 16 shown in FIGURE 3.

In casting liquid polymers, a controlled quantity of an appropriate polymerization catalyst is added to the liquid plastic just prior to its use. As shown in FIGURE 1, the catalyst is intimately blended into the fluid body 12 by means of an agitator 18 driven by any appropriate power source such as the motor 20.

By virtue of the viscosity of the fluid body 12, quantities of air are trapped within the fluid body 12 during the agitation process. As shown in FIGURE 2, deaeration of the fluid body 12 is accomplished by subjecting the fluid in the tank 10 to a vacuum environment. This is accomplished by removing the agitator assembly and placing an end cap 22 over the upper open end of the tank 10. The end cap 22 is connected by a conduit 23 to an appropriate vacuum source. Subjection of the fluid body 12 to a vacuum causes any air bubbles within the fluid to rapidly rise to the surface where they are eliminated.

As observed in FIGURE 3, the de-aerated fluid mixture of liquid plastic and catalyst is transferred from the tank 10 to a mold 25 via the transfer pipe 16. The pipe 16 is coupled at one end to the open bottom of the tank 10 and, at its opposite end, to the base of the mold 25.

A piston 27, powered by a hydraulic cylinder 29 or any other appropriate drive means, seals the upper open end of the tank 10 and is adapted for vertical movement along the inner surfaces of the tank. Hence, downward movement of the piston 27 within the tank 10 drives the fluid body 12 through the transfer pipe 16 to the mold 25 and provides a convenient means for regulating the hydraulic pressure of the fluid within the mold cavity 28.

A bubble screen 29 is interposed in the transfer pipe 16 to aid in further removing any air bubbles still remaining in the liquid being transferred to the mold.

An inlet valve 31 is provided in the transfer pipe 16, and an outlet valve 33 is provided in an exit pipe 35 communicating with the upper end of the mold 25 in FIGURE 3. The valves 31 and 33 are preferably of the gate valve variety for easy cleaning, but may be of any appropriate design capable of withstanding the necessary hydraulic pressures.

As best observed in FIGURE 4, the main body of the mold 25 comprises a pair of complementary half sections 37, 39. The sections 37, 39 are adapted to seal the mold 25 by abutting each other in mating engagement along any convenient split plane 40 which is usually a central plane through the mold. The mold sections 37, 39 may be fabricated of any suitable structural material, such as reinforced plastic, metal, or the like. A practical arrangement is one in which the mold sections 37, 39 are fabricated of fiberglass reinforced epoxy resin, and a core 42 (see FIGURES 3–5) adapted for insertion within the mold 25 is fabricated of a light metal such as aluminum.

In assembling the mold 25, with the core 42 installed in its proper position within the mold, the two mold sections 37, 39 are held together by any appropriate clamping means, as by the ram 44 and platen 45 of a suitable press (see FIGURE 4).

Both the transfer pipe 16 and the exit pipe 35 are located symmetrically about the split plane 40 of the mold 25 to facilitate installation and removal of each of these conduits when the mold is opened. To this end, the transfer pipe 16 and exit pipe 35 are provided with hexagonal collars or other appropriate fittings 47, 49, respectively, which are adapted to seat within mating recesses provided within the mold sections 37 and 39.

The upper and lower surfaces 51, 52, respectively, of the assembled mold 25 are tapered to provide bearing surfaces which serve to automatically center the core 42 when it is installed within the mold. In this connection, the core 42 carries a cap 54 in threaded engagement with, or otherwise appropriately secured to, each end of the core. As will be apparent from FIGURES 3, 5 and 6, the end caps 54 are shaped to mate with the bearing surfaces 51 and 52 at the upper and lower ends of the mold 25, and thereby precisely align the core 42 within the mold.

Each of the caps 54 are provided with a plurality of dikes or grooves 56 which intersect at the apex 57 of the cap. Hence, when the core 42 and caps 54 are installed within the mold 25, the grooves 56 abut the surfaces 51 and 52 of the mold to provide a plurality of end sprues 59 (see FIGURES 3 and 4) through which the plastic casting liquid may be admitted to the mold cavity 28.

The transfer pipe 16 terminates adjacent the apex 57 of the lower cap 54 and thereby simultaneously feeds liquid to the mold cavity 28 through all of the lower end sprues 59. When the mold is filled, excess liquid passes through the upper end sprues 59 and into the exit pipe 35 which communicates with the apex 57 of the upper core cap 54.

The exit pipe 35 is connected to an appropriate vacuum source to assist in filling the mold 25 and to provide additional de-aeration for removing entrapped air bubbles within the liquid.

Operation of the apparatus of FIGURE 3 is as follows. Both the inlet valve 31 and the outlet valve 33 are opened. The piston 27 is then moved downwardly in the tank 10 to drive the fluid body 12 through the transfer pipe 16 and into the mold 25, where the liquid passes through the end sprues 59 into the mold cavity 28. When the mold is filled, as indicated by a sight glass 61 in the side of the exit pipe 35, the outlet valve 33 is closed. Pumping of liquid into the mold 25 is then continued until the desired hydraulic pressure level is attained within the mold. This hydraulic pressure is indicated by a pressure gauge 63 communicating with the transfer pipe 16 at the base of the mold. Upon reaching the desired pressure level, the inlet valve 31 is closed. The cure cycle for the liquid polymer plastic then proceeds to completion, either with or without the use of elevated mold temperatures depending upon the specific plastic material employed. At the end of the cure cycle, the clamping pressure upon the mold sections 37, 39 is removed to release the sections, and the mold 25 is then opened to remove the cured article. It will be appreciated that the waste material remaining within the sprues 59 may be removed or severed so that the end portions or caps 54 may be removed from the core 42 to facilitate disassociation of the core from the product in a conventional manner.

Although the invention has been illustrated and described for molding a simple close dimension, cylindrical sleeve or coating of uniform wall thickness about the core 42, it is to be understood that other, more complex, configurations can be as readily molded by varying the shape of the core 42 and the inner wall surfaces of the mold sections 37, 39.

The core 42 may be left in place within the cured article. If, however, it is desired to remove the core from the cured article, then it is necessary to cut away the plastic material deposited in the sprues. Since the caps of the core are threaded onto the center portion 42 they may be now screwed and the center portion 42 of the core can then be removed leaving a cylindrical article.

The apparatus of the present invention is also useful for potting various articles within liquid polymer plastics. In this regard, the article to be potted is installed within the mold 25 as a substitute for the core 42. In such potting applications, the article to be potted is provided with suitable indexing means adapted to engage one or more of the end caps 54, for proper alignment of the article within the mold.

Polymerization catalysts generally require the presence of moisture to promote curing of the plastic. Below specific levels of relative humidity, depending upon the liquid plastic and catalyst employed, curing of the plastic may be inhibited. Moreover, before each use of the molding apparatus, all plastic contacting surfaces of the mold 25 and core 42 are freshly coated with a release agent to minimize adhesion of the plastic to the surfaces. By using a water base or water soluble release agent, traces of surface moisture are introduced into the closed cavity mold to promote curing of the liquid polymer. Sodium lauryl sulphate has proven very satisfactory as a release agent for such purposes.

In potting applications, the bond between the article being potted and the potting plastic may be further improved by utilizing suitable adhesive primers. Wherever adhesion is desired on a specific article surface, the release agent is excluded from that surface. However, the release agent is used on all other molding surfaces.

A variation of the liquid polymer casting technique enables elimination of the agitation and de-aeration stages illustrated in FIGURES 1 and 2. This technique depends upon surface catalyzation of the liquid polymer material, in which minute quantities of the catalyst will promote curing of the liquid. In carrying out this technique, the molding surfaces are coated uniformly with the required catalyst material prior to pumping the liquid plastic into the mold.

The present invention satisfies a long existing need in the plastics industry for an apparatus capable of precisely casting liquid polymer materials into complex configuration having extremely close dimensions.

It will be apparent from the foregoing that, while particular forms of my invention have been illustrated and described, various modifications can be made without departing from the spirit and scope of my invention. Accordingly, I do not intend that my invention be limited, except as by the appended claims.

I claim:

1. A casting apparatus for use in a liquid plastic casting system comprising:
    a closed, two sectioned mold including a mold cavity therein;
    an inlet and an outlet pipe communicating with said mold cavity, said inlet pipe being provided for injecting liquid polymers into said cavity and said outlet pipe being provided for discharging liquid polymers from said cavity;
    valves on said inlet and outlet pipes for selectively isolating said mold cavity from system pressures;
    a three-sectional core centrally disposed within said cavity, said core including a central section and opposed conical ends provided with means forming sprues therein and which mate with corresponding portions of said mold cavity; said corresponding portion of said mold cavity comprising means defining conical bearing surfaces arranged adjacent the inlet and outlet pipes to thereby achieve a central disposition of the core within the cavity and maintain the core centrally disposed during the following filling of the mold cavity with liquid polymers;
    means for pumping a liquid plastic into said mold cavity through said inlet pipe and raising the pressure of said liquid within the system to a selected pressure level;
    and means for evacuating air from said mold cavity through said outlet pipe.

2. A hydraulic casting aparatus for liquid polymers, according to claim 1, wherein said core includes a cylindrical central section which releasably mates with said opposed conical sections.

3. In a two-sectioned core-mold of the type having a cavity including means defining therein inlet and outlet ports disposed between a pair of pressure control valves, the improvement comprising in combination:
    bearing surfaces disposed within the cavity adjacent said ports;
    a core member seated in the bearing surfaces and including an elongated central body portion and a pair of conical end members disposed within said bearing surfaces for supporting the core adjacent the inlet and outlet ports of the cavity and in alignment therewith;
    and means defining uniformly distributed, radially directed sprues extending from said ports to said body, whereby flowable casting material may be forced from one pressure control valve to the other valve through said sprues along said body.

4. A sectional core member to be employed in casting apparatus of the type which employs a core member disposed within a closed cavity into which a casting material is injected under elevated pressures through sprues, comprising in combination:
    a body section comprising an elongated member of a predetermined cross-sectional configuration;
    first and second conical end sections each including means defining a plurality of sprues radiating from the apex and terminating at the circumference thereof;
    and means coupling said end sections with said body section and a core mold within which said core member is disposed, said core mold having opposed wall surface means therein for aligning said core member by its conical end sections.

References Cited
UNITED STATES PATENTS

| | | | |
|---|---|---|---|
| 761,649 | 6/1905 | Richards | 18—26 |
| 806,783 | 12/1905 | Dayton | 18—26 |
| 816,144 | 3/1906 | Ames | 18—26 |
| 2,696,022 | 12/1954 | Steinbock et al. | 18—26 |
| 3,016,574 | 1/1962 | Fischer et al. | 18—26 |
| 3,044,118 | 7/1962 | Bernhardt et al. | 18—26 |
| 2,358,857 | 9/1944 | Gits | 18—30 |
| 2,614,056 | 10/1952 | Kraft. | |
| 2,624,071 | 1/1953 | Strahm et al. | 18—30 |
| 2,970,343 | 2/1961 | Johnson et al. | 18—45 |

WILLIAM J. STEPHENSON, *Primary Examiner.*